United States Patent [19]
Schweitzer, Jr.

[11] 3,781,682
[45] Dec. 25, 1973

[54] RESETTABLE FAULT INDICATING MEANS HAVING A RINGLIKE MAGNETIC CIRCUIT

[75] Inventor: Edmund O. Schweitzer, Jr., Northbrook, Ill.

[73] Assignee: E. O. Schweitzer Manufacturing Co., Inc., Mundelein, Ill.

[22] Filed: Sept. 18, 1972

[21] Appl. No.: 290,215

Related U.S. Application Data
[62] Division of Ser. No. 119,639, March 1, 1971, Pat. No. 3,702,966.

[52] U.S. Cl. .................... 324/133, 324/51, 324/127, 340/253 A
[51] Int. Cl. ..................... G01r 19/16, G01r 31/02
[58] Field of Search ...................... 324/127, 133, 51, 324/103; 340/253 R, 253 A, 253 P

[56] References Cited
UNITED STATES PATENTS

| | | | |
|---|---|---|---|
| 3,426,275 | 2/1969 | Schweitzer | 324/127 |
| 3,375,510 | 3/1968 | Pitches | 324/133 X |
| 3,413,548 | 11/1968 | Schweitzer | 324/133 |
| 3,426,276 | 2/1969 | Schweitzer | 324/127 |
| 3,705,350 | 12/1972 | Martin | 324/133 |

Primary Examiner—Gerard R. Strecker
Attorney—Robert R. Lockwood

[57] ABSTRACT

A capacitor is charged through a capacitive coupling to a high voltage alternating current electric power conductor and is discharged when the charge reaches a predetermined value to reset a fault indicator that previously had been operated by flow of fault current in the conductor. The magnetic circuit employs a demagnetizable low coercive force core in the form of a bifurcated yoke or a ring having magnetizing windings energized on discharge of the capacitor. A manually resettable fault indicator employing a demagnetizing winding on a low coercive force ring also is disclosed.

6 Claims, 8 Drawing Figures

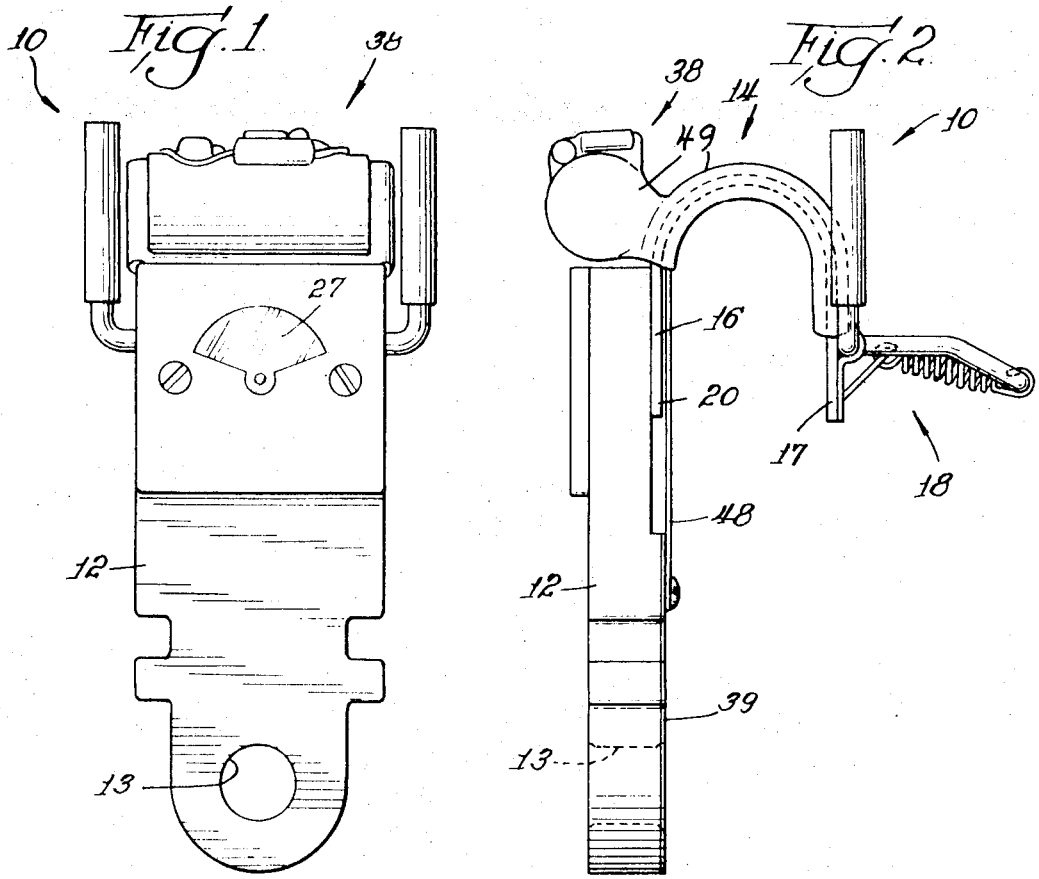
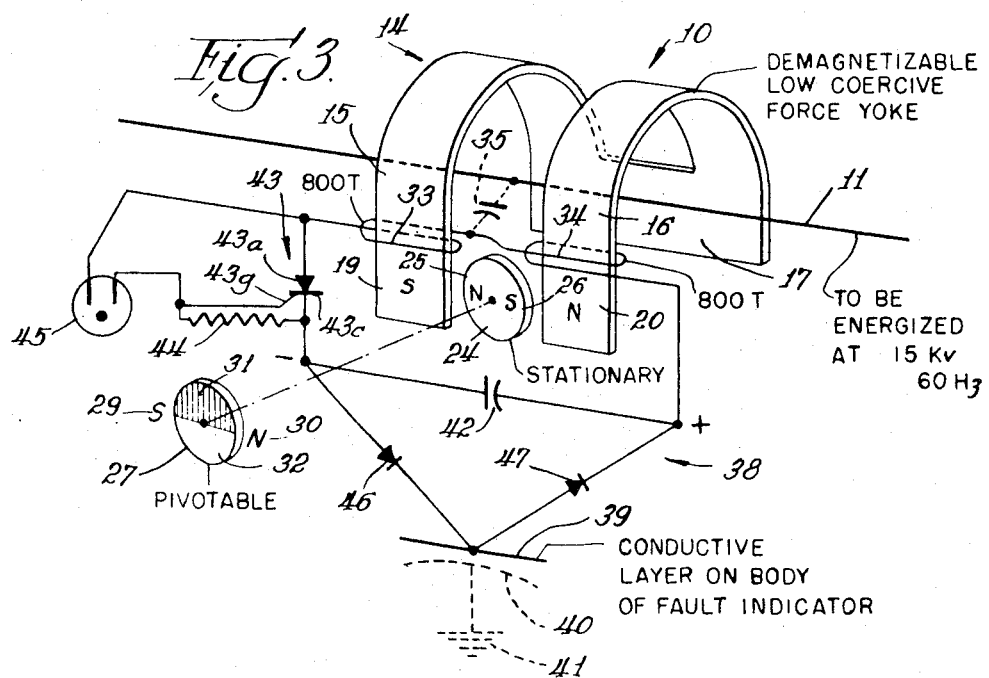

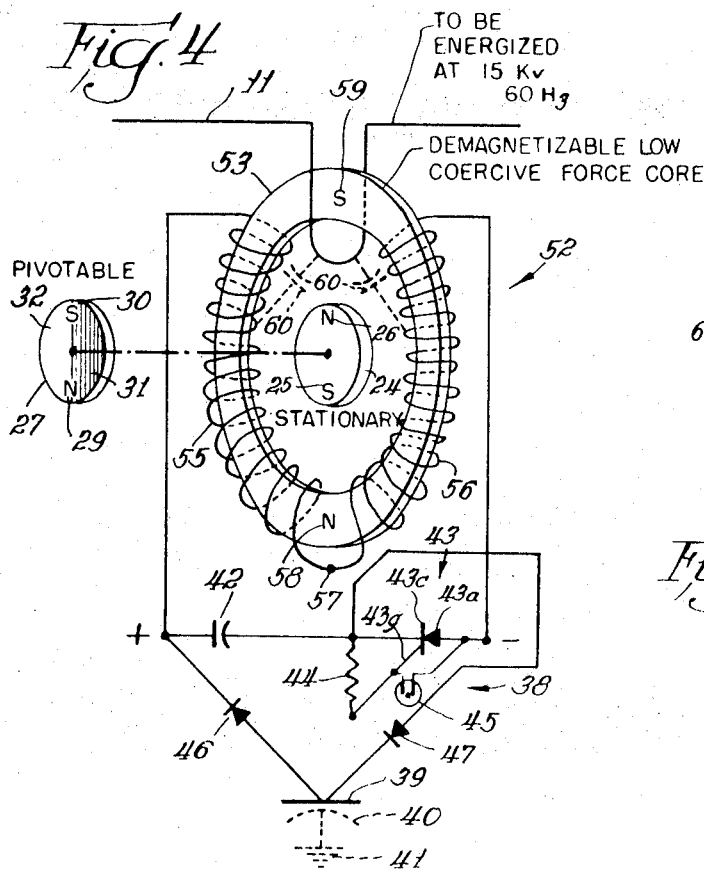
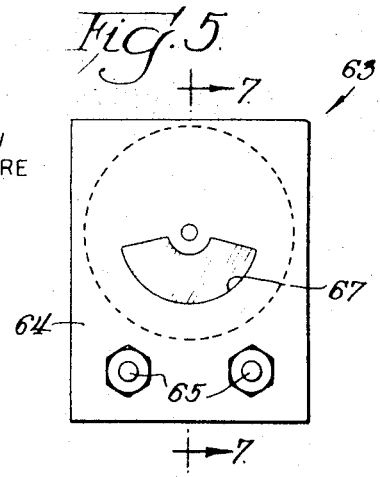
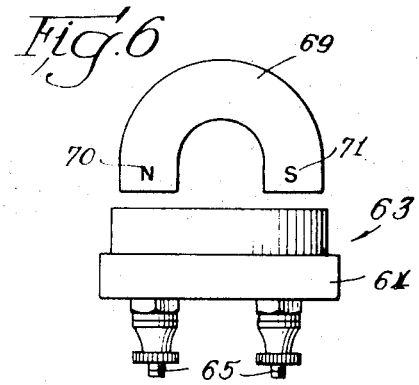
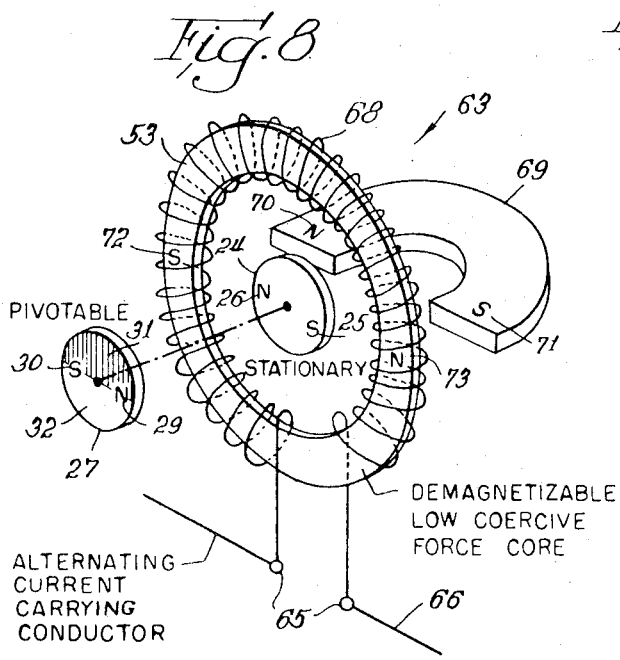
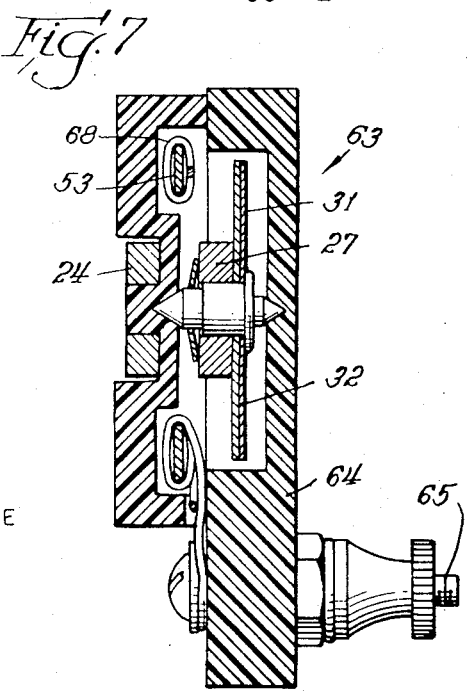

RESETTABLE FAULT INDICATING MEANS HAVING A RINGLIKE MAGNETIC CIRCUIT

This application is a division of application Ser. No. 119,639, filed Mar. 1, 1971, now Pat. No. 3,702,966, issued Nov. 14, 1972. This invention is an improvement over the systems disclosed in U.S. Pat. Nos. 3,348,099, issued Oct. 17, 1967, 3,426,275 issued Feb. 4, 1969, and 3,426,276, issued Feb. 4, 1969 and in application Ser. No. 55,532, filed July 16, 1970, now abandoned.

Among the objects of this invention are: To provide for resetting a fault indicator that has been operated by fault current flow in a high voltage alternating current electric power conductor on restoration of energization of the conductor and independently of current flow therein; to charge a capacitor from the energized conductor and to discharge it through a resetting winding on the low coercive force core of the fault indicator; to measure the charge on the capacitor and to discharge it when the charge reaches a predetermined value by closure of a switch; to employ for the switch an SCR the conductivity of which is controlled by a space discharge device that becomes conducting when the charge on the capacitor reaches the preset value; to provide the magnetic core for the fault indicator in the form of a bifurcated yoke or a ring with magnetizing windings on the distal ends of the yoke or wound in opposite directions on the ring; and to provide a manually resettable fault indicator having a magnetic core in the form of a ring with a demagnetizing winding wound thereon, the core being magnetized by a manually positionable permanent magnet.

In the drawings:

FIG. 1 is a view in front elevation and at full scale of an automatically resettable fault indicator embodying this invention.

FIG. 2 is a view, in side elevation, of the fault indicator shown in FIG. 1.

FIG. 3 illustrates diagrammatically the circuit connections that are employed in the fault indicator shown in FIGS. 1 and 2.

FIG. 4 shown diagrammatically the circuit connections that can be employed for an automatically resettable fault indicator having a magnetic core in the form of a ring.

FIG. 5 is a view, in front elevation and at full scale, of a manually resettable fault indicator employing the magnetic core in the form of a ring shown in FIG. 4.

FIG. 6 is a top plan view of the fault indicator shown in FIG. 5 together with an associated resetting permanent magnet.

FIG. 7 is a sectional view, at an enlarged scale, taken generally along line 7—7 of FIG. 5.

FIG. 8 shows diagrammatically the circuit connections that can be employed for the manually resettable fault indicator shown in FIGS. 5, 6 and 7.

In FIGS. 1, 2 and 3 reference character 10 designates, generally, an automatically resettable fault indicator embodying this invention. The fault indicator 10 is arranged to be associated with a high voltage electric power distribution conductor 11 that, for example, may be energized at 15 Kv 60 Hz. However, other voltages and frequencies can be employed. The fault indicator 10 includes a support or handle 12 of suitable insulating material having an eye 13 for receiving the hook of a live line tool for applying the fault indicator 10 and removing it from the conductor 11.

Mounted on the rear side of the support or handle 12 is a demagnetizable magnetic core of low coercive force magnetic material in the form of a bifurcated yoke. The magnetic core 14 includes arms 15 and 16 with a connecting section 17 therebetween. A clamp mechanism, indicated generally at 18, is employed for holding the fault indicator 10 in place on the conductor 11.

Normally the distal ends 19 and 20 of the arms 15 and 16 are magnetized to the polarities indicated at S and N. On the flow of predetermined current in the conductor 11 the alternating magnetic field demagnetizes the arms 15 and 16 of the magnetic core 14.

Located between the distal ends 19 and 20 of the magnetic core 14 is a stationary permanent magnet 24 having poles 25 and 26. It will be observed that the poles 25 and 26 of the stationary permanent magnet 24 are located adjacent opposite poles of the distal ends 19. Associated with the stationary permanent magnet 24 is a pivotable permanent magnet 27 that has poles 29 and 30 which are indicated at S and N. Also the pivotable permanent magnet 27 is provided with indicator sections 31 and 32. When sufficient alternating current flows through the conductor 11, the distal ends 19 and 20 of the magnetic core 14 are demagnetized with the result that the magnetic field from the poles 25 and 26 of the stationary permanent magnet 24 is capable of reacting with the magnetic field from the poles 29 and 30 of the pivotable permanent magnet 27 to cause it to pivot to the position shown in FIG. 3. In this position the indicator section 31 is visible and shows that the predetermined current has flowed through the conductor 11. When the distal ends 19 and 20 of the magnetic core 14 are remagnetized so that the magnetic field therefrom exceeds that of the stationary permanent magnet 24, then the pivotable permanent magnet 27 is shifted through 180° so that its poles 29 and 30 will be adjacent unlike poles of the distal ends 19 and 20.

In order to automatically remagnetize the distal ends 19 and 20 of the magnetic core 14 provision is made for generating magnetic fields to induce in the distal ends 19 and 20 poles of the polarity indicated. For this purpose windings 33 and 34 are provided around the distal ends 19 and 20. For illustrative purposes it is pointed out that each of the windings 33 and 34 may comprise 800 turns of No. 26 wire. These windings 33 and 34 extend over substantial portions of the bights of the magnetic core 14. When the fault indicator 10 is in position on the conductor 11 the windings 33 and 34 have a capacitive connection thereto as indicated at 35. Associated with the windings 33 and 34, which are connected in series, is a charging system that is indicated, generally, at 38. The charging system 38 includes a counterpoise 39 that may be in the form of a plate or layer of conducting material on the rear side of the support or handle 12. The counterpoise 39 may be formed of good conducting material such as aluminum or it may be formed of high resistance material as may be desired. It will be observed in FIG. 3 that the counterpoise 39 constitutes one plate of a capacitor the opposite plate 40 of which is indicated by broken lines and it is capacitively connected to ground indicated at 41.

The windings 33 and 34 are arranged to have magnetizing current flow therethrough from a capacitor 42 that is connected in shunt circuit relation therewith through switch means indicated at 43. In this embodiment of the invention the switch means 43 comprises an SCR having an anode 43a, a cathode 43c and a gate 43g. A resistor 44 is connected between the gate 43g and the cathode 43c. For measuring the charge on the capacitor 42 a space discharge device 45 in the form of a neon lamp is employed. When a predetermined voltage appears across its terminals, it becomes conducting and causes the SCR 43 to become conducting. As a result the charge on the capacitor 42 is discharged through the windings 33 and 34. To permit charging of the capacitor 42 rectifiers 46 and 47 are connected in series and in shunt with the capacitor 42. The common connection between the rectifiers 46 and 47 is connected by a conductor 48, FIG. 2, to the counterpoise 39.

In describing the operation of the fault indicator 10 it will be assumed that the pivotable permanent magnet 27 has been shifted to the indicating position shown in FIG. 3 and that the distal ends 19 and 20 have been demagnetized. As a result of flow of fault current through the conductor 11, it can be assumed that the circuit is interrupted by either a fuse or a circuit breaker and that it is thereby deenergized until the fault can be located and removed. It is desirable that, when the conductor 11 is again energized, the fault indicator 10 be automatically reset. When this occurs on the plus half cycle of the alternating current the counterpoise 39 is charged positively through the rectifier 46. This results from the capacitve connection 35 between the conductor 11 and the windings 33 and 34 and the capacitive connection between the counterpoise 39 and ground 41. On the next or negative half cycle of the alternating current, the positive charge on the counterpoise 39 flows through the rectifier 47 to the capacitor 42 which may be 2 mfd capacitor where it is held. This cycle of operation is repeated until the voltage applied through the resistor 44 and across the neon lamp 45 is sufficient to cause the latter to become conductive. Thereupon the SCR 43 becomes conducting and the charge on the capacitor 42 is discharged through the windings 33 and 34. Because of this the distal ends 19 and 20 are remagnetized so that the magnetic field therefrom exceeds that from the stationary permanent magnet 24. Accordingly, the pivotable permanent magnet 27 is shifted through 180° to the non indicating position in which the indicator sections 31 and 32 are reversed in position. The time required to charge the capacitor 42 and effect its discharge may be of the order of several seconds.

As pointed out the windings 33 and 34 are located on the arms 15 and 16 of the magnetic core 14. In addition the capacitor 42 and other elements making up the charging system 38 also are mounted on the magnetic core 14, as shown in FIGS. 1 and 2, immediately above the upper end of the support or handle 12. The windings 33 and 34 and the charging system 38 are suitably encapsulated so as to provide a unitary construction.

In FIG. 4 the reference character 52 designates, generally, a modified form of automatically resettable fault indicator. It includes a demagnetizable magnetic core 53 in the form of a ring on which windings 55 and 56 are provided. It will be observed that these windings are wound in opposite directions and that they are connected in series at 57. The reason for the oppositely wound relationship of the windings 55 and 56 is to provide poles 58 and 59 at diametrically opposite positions in the magnetic core 53. In this embodiment the high voltage conductor 11 extends through the magnetic core 53, as indicated, and it is capacitively connected, as indicated at 60, to the windings 55 and 56.

For causing sufficient magnetizing current to flow through the windings 55 and 56 the charging system, shown generally at 38 and described hereinbefore, can be employed. Since the functioning of the modified automatically resettable fault indicator 52 is essentially the same as that of the fault indicator 10, a further description is believed to be unnecessary.

There is an advantage in employing the magnetic core 53 in the form of a ring in that the effect of the diametric magnetic flux from the poles 58 and 59 on the pivoted permanent magnet 27 is eliminated on flow of predetermined fault current thereby leaving the pivoted permanent magnet 27 to be subject only to the magnetic flux from the poles 25 and 26 of the stationary permanent magnet 24. This is due to the redirection of the diametric magnetic flux from the poles 58 and 59 to the circumference of the ringlike core 53. On flow of predetermined alternating fault current in the conductor 11 either half cycle will divert the magnetic flux from the diametric path to an annular path through the ringlike core 53 where this flux will have a closed path and will not influence the pivoted permanent magnet 27. The direction of the circumferential flux, whether clockwise or counterclockwise, depends on which half cycle of the alternating current the fault or over current occurs. The elimination of the diametric magnetic flux in the manner described places the pivoted permanent magnet 27 solely under the influence of the magnetic field from the stationary permanent magnet 24 and facilitates shifting of the pivoted permanent magnet 27 to the alternate indicating position.

In FIGS. 5, 6, 7 and 8 there is indicated, generally, at 63 a manually resettable fault indicator. It includes a housing 64 of suitable insulating material which is provided with line terminals 65 to which sections of a conductor 66 are arranged to be connected as illustrated in FIG. 8. The conductor 66 may be a low voltage conductor arranged normally to carry alternating current of relatively small magnitude, for example, 10 amperes. In the event that a fault current of the order of 50 amperes flows in the conductor 66, the fault indicator 63 is operated to show that this has taken place.

The housing 64 is provided with a window 67 through which the pivotable permanent magnet 27, previously described can be viewed. Only one or the other of the indicator sections 31 or 32 can be seen at any one time. Associated with the pivotable permanent magnet 27 is the stationary permanent magnet 24, previously described. It is located concentrically with the magnetic core 53 in the form of a ring.

In order to normally magnetize the magnetic core 53 a permanent magnet 69 is employed. It is arranged to be moved manually with respect to the magnetic core 53 so as to induce therein from its poles 70 and 71 poles 72 and 73. It will be understood that the magnetic field from the induced poles 72 and 73 is considerably in excess of the magnetic field from the poles 25 and 26 of the stationary permanent magnet 24. As a result the pivotable permanent magnet 27 normally occupies a position the reverse of that shown in FIG. 8. Now when sufficient alternating current flows through the conductor 66 and through the winding 68, the magnetic field from the poles 72 and 73 in the magnetic core 53 is reduced to a value below that of the stationary permanent magnet 24. Because of this the pivotable permanent magnet 27 is shifted to the fault indicating position.

The elimination of the diametric magnetic flux from the poles 72 and 73, FIG. 8, on flow of predetermined fault current in conductor 66 has the same effect and advantage described above in connection with the fault indicator 52.

I claim:

1. Means responsive to flow of alternating current in a conductor comprising: a ringlike magnetic member having relatively low coercivity, winding means on said ringlike magnetic member for connection to a unidirectional current source for magnetizing said ringlike magnetic member along a diameter with unidirectional magnetic flux, a movable permanent magnet positioned in said unidirectional magnetic flux with its poles adjacent unlike poles of said ringlike magnetic member, said ringlike magnetic member surrounding said conductor whereby magnetic flux generated by flow of alternating current in said conductor reduces the magnitude of said unidirectional magnetic flux along said diameter and redirects the same to said ringlike magnetic member where it has a closed path and is ineffective to react with the magnetic flux from said movable permanent magnet, and means biasing said movable permanent magnet to an alternate position to which it moves on reduction of said unidirectional magnetic flux along said diameter by flow of current in said conductor sufficient to permit said biasing means to operate as aforesaid.

2. Means responsive to current flow in a conductor according to claim 1 wherein said biasing means is a stationary magnet in the field of said ringlike magnetic member with its poles adjacent unlike poles thereof.

3. Means responsive to flow of alternating current in a conductor comprising: a ringlike magnetic member having relatively low coercivity, means for inducing magnetic poles of opposite polarity in said ringlike magnetic member along a diameter thereof, a stationary permanent magnet having its poles along said diameter and adjacent unlike said induced poles in said ringlike magnetic member, the magnetic field from said induced poles being considerably in excess of the magnetic field from said poles of said stationary magnet, a movable permanent magnet in the magnetic fields from said induced poles and from said poles of said stationary magnet with its poles normally adjacent unlike said induced poles in said ringlike magnetic member, and winding means on said ringlike member connected in series with said conductor whereby magnetic flux generated by predetermined flow of alternating current in said winding means reduces the magnitude of the flux induced in said ringlike magnetic member along said diameter and redirects the same to said ringlike magnetic member where it has a closed path and is ineffective to react with the magnetic flux from said movable permanent magnet sufficiently to cause the magnetic field from said stationary permanent magnet to shift said movable permanent magnet to an alternate position with its poles adjacent unlike said poles of said stationary permanent magnet.

4. Means responsive to current flow in a conductor according to claim 3 wherein said means for inducing magnetic poles of opposite polarity in said ringlike magnetic member is a permanent magnet.

5. Means responsive to current flow in a conductor according to claim 3 wherein said winding means is a winding distributed along said ringlike magnetic member.

6. Means responsive to current flow in a conductor according to claim 3 wherein said movable permanent magnet carries indicia indicating the position to which it was last operated.

* * * * *